Nov. 13, 1962 P. J. KROON 3,063,142
METHOD OF MAKING TUBING STRUCTURES
Filed March 6, 1959

INVENTOR.
PIETER J. KROON
BY *William J. Foley*
ATTORNEY

United States Patent Office 3,063,142
Patented Nov. 13, 1962

3,063,142
METHOD OF MAKING TUBING STRUCTURES
Pieter J. Kroon, 115 Forest Lane, Swarthmore, Pa.
Filed Mar. 6, 1959, Ser. No. 797,704
6 Claims. (Cl. 29—424)

This invention relates to a method of making tubing structures, particularly thin walled corrugated tubes of small size.

Heretofore, at least two obstacles stood in the way of successful manufacture and use of corrugated tubes or bellows in small sizes, for example, less than one half inch in diameter. The first was the difficulty and impracticability of prior methods for working and handling thin wall tubes. Obviously, in the manufacture of small diameter flexible tubing, extremely thin material must be used if any degree of flexibility is to be obtained. With prior methods, fairly thick walled tubing had to be used in order to prevent its being deformed and damaged during handling and working. Secondly, prior methods did not enable a sufficiently large number of corrugations to be provided in a given length of tubing to give the finished product a useable degree of extensibility or compressibility. In other words, prior attempts to produce small diameter, flexible tubing resulted in the production of tubing which had virtually no flexibility because of the thickness of the material used and the small number of corrugations provided, so that such products failed after but a few flexures due to high internal stresses.

My invention has as its principal objective the production of flexible tubing having both a thin wall and a large number of corrugations per unit length, so that unusual flexibility is obtained.

This objective is achieved through the use of a novel method of providing corrugations in the tube. In accordance with my invention, known methods are utilized to provide spaced preliminary corrugations in a metal tube, or cylinder, that has a consumable covering on the exterior and interior surfaces thereof. The preformed tube is then subjected to endwise forces to close the corrugations. Thereafter, the tube is subjected to the action of an agent which consumes the covering material without attacking the tube wall; leaving a tube having many, closely spaced corrugations.

In accordance with my invention, the covering may be applied to the tube member before or after the preliminary corrugating operation. I prefer to apply the covering before corrugating step and to interpose a wall thickness reducing operation between application of the covering and the corrugating step. By so doing I am able to start with tubing which is too thick walled for the finished product but is easily handled, and reduce its wall to the desired thickness, yet support and protect the tube to prevent damage thereto during the corrugating operation.

Other objects, advantages and features of the invention will become apparent from the following detailed description in which reference is made to the accompanying drawing, wherein.

Figure 1:
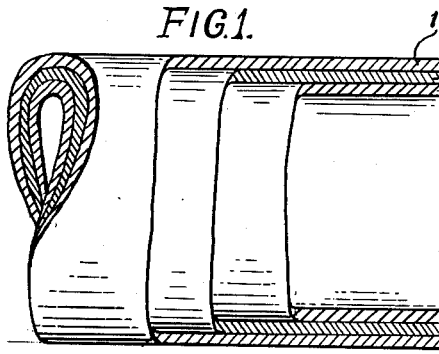
FIG. 1 is a fragmentary elevational view, partly in section, of a cylindrical tube blank having cover members disposed internally and externally thereof.

In practicing my improved method I prefer to begin with a cylindrical tube blank 11, which, although made of thin material, has a wall of such thickness as to make it impossible to handle the tube without extraordinary precautions being taken to prevent deformation or other damage to the tube. The tube 11 is made of a material, preferably metal, which is resistant to attack by a consuming agent later used in the process. Such material is hereinafter referred to as "non-consumable" material. By way of example, stainless steel, Inconel X, and Monel tubing having a wall thickness of the order of .003 inch may be employed.

The tube 11 is reinforced and supported by two cylindrical cover tubes, 12 and 13, disposed interiorly and exteriorly, respectively, of the tube 11. The inner tube 12 is of slightly smaller size, i.e. outside diameter, than the tube blank 11, and the outer tube 13 is of slightly larger size than the tube blank and when they are interfitted with the tube blank form a covering for the interior and exterior surfaces of the blank.

The cover tubes 12 and 13 are made from a material which has two principal properties or characteristics: First, the material must be consumable under the action of an agent which will not consume nor attack the material from which the tube blank 11 is made. Secondly, the material of the cover tubes should be ductile and easily worked. Copper and aluminum are particularly suitable for making the cover tubes, as these materials are readily consumed by certain acids, such as nitric acid, hydrochloric acid, and sulphuric acid, which do not attack the non-consumable material of the tube blank. Copper and aluminum are also soft and easily worked.

Figure 2:
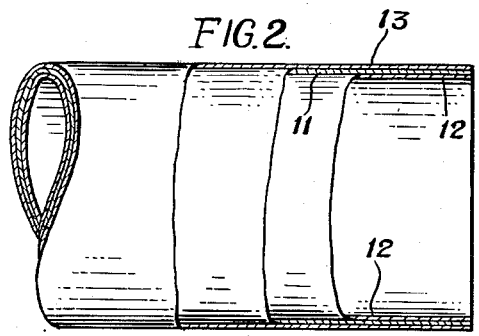
FIG. 2 is a view similar to FIG. 1 but showing the tube blank after a reducing operation.

The tube blank 11, with cover tubes 12 and 13 thereon, next is worked to reduce the wall thickness thereof to the dimension desired in the finished tube structure, which dimension may be of the order of .001 inch. This reduction may be effected by any known method, as by rolling or by drawing the assembly through concentric dies. The cover tubes, although reduced in wall thickness by this operation, nevertheless continue to provide support for the tube blank and make it easier to handle. The reduced assembly is illustrated in FIG. 2.

Figure 3:
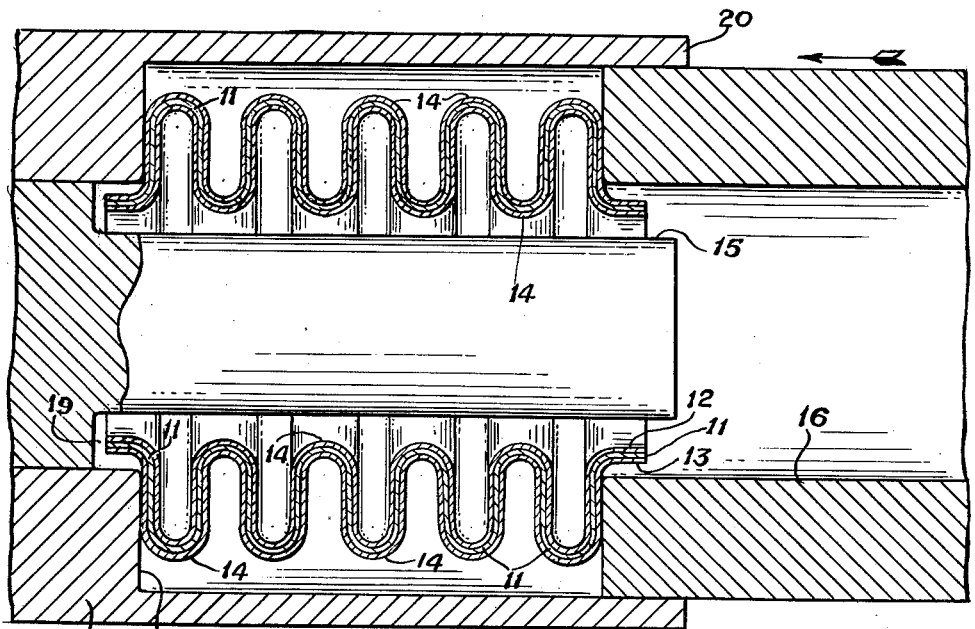
FIG. 3 is a vertical sectional view through apparatus employed to perform a corrugation closing step on the partially formed tube structure.

The tube blank 11, with cover tubes 12 and 13 thereon, next is worked to form preliminary corrugations 14 therein. These corrugations (see FIG. 3) may be formed by any known method, such as rolling, inasmuch as the spacing of the corrugations is not critical, nor to such small dimensions that the operation requires special equipment or techniques. Moreover, the corrugations may be formed in spaced, parallel fashion, as shown, or may be formed as a helix.

In accordance with my invention, the covered and precorrugated tube 11 is next subjected to endwise forces to substantially close the preliminary corrugations 14. This compressing, or closing, step is performed on apparatus such as that illustrated in FIG. 3, which comprises a cylindrical mandrel 15 for supporting the precorrugated tube, and a tubular piston, or plunger, 16 which is movable axially of the mandrel for applying the endwise force to the tube. The mandrel 15 is stationarily supported by a bed member 17 having an annular face 18 thereon against which the tube 11 is compressed. The mandrel 15 and the bed member 17 are preferably constructed to provide an annular groove 19 at the base of the mandrel for receiving the end of the tube 11. If desired, the bed member 17 may include a cylindrical guide sleeve 20 for assisting the mandrel in guiding the tube 11 as the tube is compressed.

Figure 4:
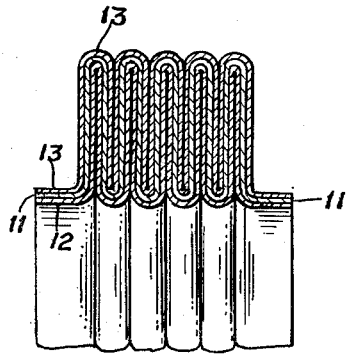
FIG. 4 is a fragmentary, longitudinal sectional view through the tube structure after the corrugation closing step.

Sufficient endwise force is applied to the precorrugated tube 11 to substantially collapse the corrugations 14 in the tube and to bring the radial faces of cover tubes 12 and 13 into engagement (see FIG. 4). Within reasonable limits the force applied is not critical because the cover tubes limit the amount by which tube 11 can be compressed and actually determine final spacing of the corrugations in the tube 11.

It may be desirable to heat treat the tube blank and cover tubes between the reducing operation and the corrugating operation, and again after the corrugating operation, to anneal the tube blank and the cover tubes. Most metals have a tendency to work harden and become brittle when worked extensively, so that annealing steps imposed between, and, or during the working steps of my method are preferably used to maintain the materials in ductile condition.

Figure 5:
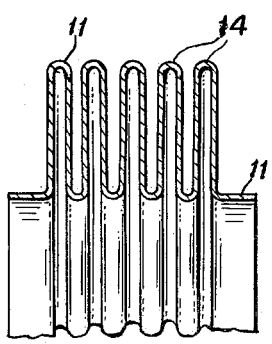
FIG. 5 is a view similar to FIG. 4 showing a portion of the completed tube structure.

The compressed and fully corrugated tube 11 is next subjected to a treatment which consumes the cover tubes 12 and 13 to form the finished tube shown in FIG. 5. If copper or aluminum is employed for the cover tubes a bath of nitric acid, sulphuric acid, or hydrochloric acid is effective to consume the cover tubes without attacking tube 11, which, as mentioned previously, is formed of a non-consumable material.

By my improved method I am able to form flexible tube structures having a wall thickness of the order of .001 inch and having over one hundred corrugations per inch of length. While my method is particularly suitable for forming tube structures of small size, for example, less than one half inch in length and diameter, the principles of the invention are applicable to methods of forming larger tube structures, particularly where space limitations require that the tube structures have a large number of corrugations in a short length.

One of the features of my improved method which results in the finished tube structure having greater flexibility than tube structures formed by previously known methods is the shape of the finished corrugations in the tube. As can be seen from FIG. 5, the radially extending, or transverse, wall portions of each corrugation are at right angles to the axis of the tube. As thus disposed, these portions of the tube structure are subjected to minimum circumferential stresses when the tube structure is flexed; thereby insuring maximum flexibility and lift of the tube structure. This disposition of the transverse walls of the corrugations is the result of collapsing the corrugations with endwise forces, which flattens the wall portions between the cover tubes.

It should also be pointed out that variations in the above described method are contemplated as being within the scope of my invention. For example, the tube blank 11 may be provided with protective covering by methods other than by interfitting closely sized tubes, such as, by electrodepositing or otherwise applying a coating of copper or other consumable material on the interior and exterior surfaces of the tube blank. Moreover, the protective covering may be applied either before or after the tube blank receives its preliminary corrugations.

Thus, while the invention has been described in detail with reference to a preferred mode of practice, it is to be understood that certain variations and modifications may be made thereto without departing from the spirit and scope of the invention as defined in the appended claims.

What I claim is:

1. The method of making flexible metal tubing which comprises providing a corrugated tube of non-consumable material with a consumable covering on the interior and the exterior thereof, subjecting said tubing to endwise force to close said corrugations, and thereafter consuming said covering.

2. The method of making flexible metal tubing from a cylinder of non-consumable material, which comprises providing a consumable covering for the exterior and the interior of said cylinder, working said cylinder with the covering thereon to reduce the wall thickness thereof, corrugating said cylinder, subjecting said cylinder to endwise force to close said corrugations, and thereafter consuming said covering.

3. The method of making flexible metal tubing from a cylinder of non-consumable material, which comprises interfitting said cylinder between two other cylinders of slightly larger and slightly smaller size, respectively, so that said cylinders nest within each other, said other cylinders being made from consumable material, working the nested cylinders to reduce the wall thickness of all of said cylinders, corrugating said cylinders, subjecting said cylinders to endwise force to close said corrugations, and thereafter treating the unit thus formed to consume the material of said other cylinders.

4. The method of making flexible metal tubing which comprises providing a cylinder of non-consumable material with an interior and exterior covering of consumable material, corrugating said cylinder, subjecting the corrugated cylinder to endwise force to close the corrugations therein, and subjecting the cylinder to a treatment for consuming said covering.

5. The method of making flexible metal tubing which comprises providing a cylinder of acid-resistant metal, covering the exterior and the interior surfaces of said cylinder with an acid-consumable metal, working the covered cylinder to provide corrugations therein, subjecting said cylinder to endwise force to close said corrugations, and subjecting the cylinder thus formed to an acid treatment to remove said consumable metal.

6. The method of making flexible metal tubing which comprises, providing a cylinder of acid-resistant metal, interfitting said cylinder between two other cylinders of slightly smaller and slightly larger size, respectively, so that said cylinders nest within each other, said other cylinders being formed of acid-consumable metal, working the nested cylinders to reduce the thickness of their walls, corrugating said nested cylinders, subjecting the corrugated cylinders to endwise forces to close the corrugations therein, and subjecting the corrugated and closed cylinders to an acid treatment to remove said acid-consumable metal.

References Cited in the file of this patent

UNITED STATES PATENTS

| | | |
|---|---|---|
| 979,460 | Fulton | Dec. 27, 1910 |
| 1,604,216 | Brainin | Oct. 26, 1926 |
| 1,727,281 | Fulton | Sept. 3, 1929 |
| 1,891,304 | Everett | Dec. 20, 1932 |
| 2,075,815 | Knox | Apr. 6, 1937 |
| 2,485,969 | Johnson | Oct. 25, 1949 |
| 2,619,438 | Varian | Nov. 25, 1952 |